Jan. 28, 1936.  G. E. R. SALEH  2,028,881
EXPANSION DEVICE
Filed May 11, 1935
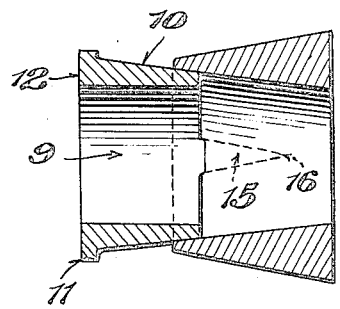
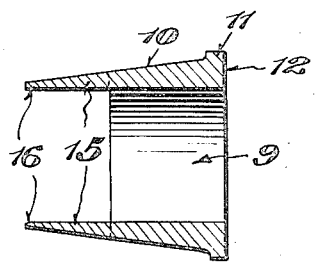
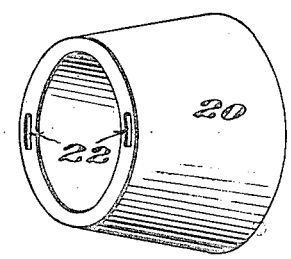
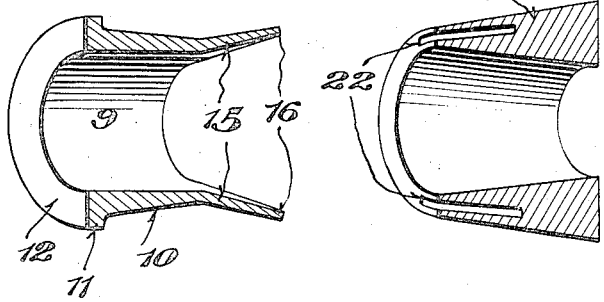
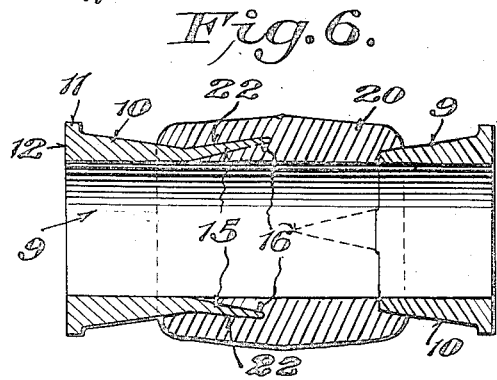
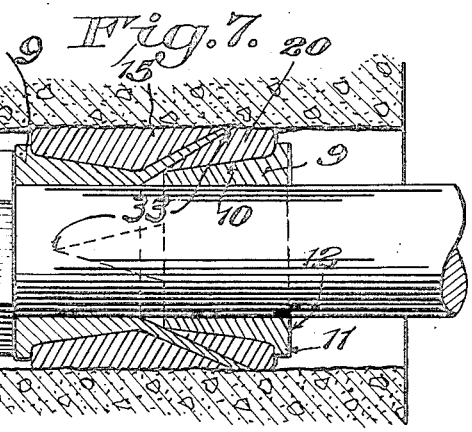
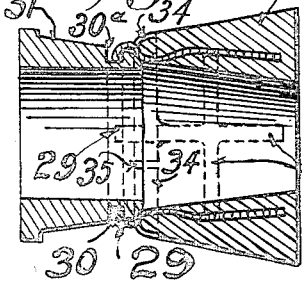
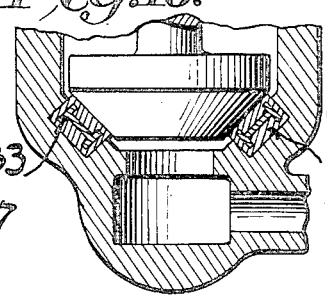
Inventor.
G. E. Rohmer Saleh,
by C. P. Goepel.
Attorney Patented Jan. 28, 1936

2,028,881

UNITED STATES PATENT OFFICE 2,028,881

EXPANSION DEVICE

Gabriel E. Rohmer Saleh, New York, N. Y.

Application May 11, 1935, Serial No. 20,971

10 Claims. (Cl. 72—105)

This invention relates to expansion devices and expansion bolts, but more particularly has for its object to provide simple and practical means of reinforcing and of providing a skeleton-like structure to the relatively plastic material constituting the expansible part of the device, and also of holding in assembled relationship the operative parts of an expansion device.

The main object of this invention being to provide reinforcement means or struts to the plastic material of which the expansible member is made, these reinforcement means can be provided either attached or forming part of the expanding member or may be placed within the mass of the expansible member forming a skeleton therein.

More particularly it is proposed to provide the expanding member with reinforcement strut-like projections which are embedded into or form part of the soft material constituting the expansible member. It is obvious that the expansion device referred to herewith is composed of a unit having an expanding member and its respective cooperating expansible member, but combinations are possible whereby two face to face expanding members with one intermediate expansible member may be used. In this case each expanding member would have its respective extending and reinforcing struts or tentacles not in alignment with each other but in staggered relation to each other. Each member could either have one reinforcing strut or more.

In the case of expansion bolts, it is desirable, in their manufacture and distribution, to supply the place where they are to be used, with an assembled unit, and in the particular invention here presented the reinforcement means afford the additional advantages or methods of holding the expansible member to the expanding member or vice versa, so that when the unit is put into operation, at the particular place where it is intended to be used, it may be readily inserted into the hole and then subjected to pressure or caulking as is well known.

Various embodiments of my invention will be described hereinafter and shown in the accompanying drawing, and the invention itself will be finally pointed out in the claims.

In the accompanying drawing,—

Figure 1 is a section partly in perspective of an expansion unit showing the expanding member engaging the expansible member and having the strut-like reinforcing projections;

Figure 2 is a perspective view of the expanding member provided with the extending reinforcing struts;

Figure 3 is a perspective view of the expansible member having openings therein to receive the struts of the expanding member shown in Fig. 2;

Figure 4 is a section of Fig. 2 showing the reinforcing struts extending from the expanding member;

Figure 5 is a section of Fig. 3 showing the openings for the reception of the reinforcing struts;

Figure 6 is a perspective view partly in section showing the two expanding members face to face with an expansible member therebetween and showing the reinforcing struts of one expanding member entering into the expansible member, the reinforcing struts on the other expanding member being placed at right angle to the reinforcing struts of the first expanding member;

Figure 7 is a longitudinal section of the expanding members having the expansible member therebetween and showing the struts acting as an abutment skeleton to the relatively soft but non-compressible expansible member;

Figure 8 is a longitudinal elevation of the expanding member provided with reinforcement means;

Figure 9 is a longitudinal section of an expansion unit having the skeleton-like reinforcement embedded into the expansible unit and protruding outwardly of same to engage a recess provided at the smaller end of the expanding member;

Figure 10 shows another embodiment of an expansible member provided with reinforcement means embedded within the expansible member.

Referring to the drawing, and more particularly to Figures 1 and 2, the expanding member is the usual cone-like male member made out of hard steel or the like, and having a sloping wall 10 merging into the peripheral rim 11. A flat surface or base 12 is at right angles to the axis of the expanding member 9 and may be used to apply pressure or force-like hammer blows or other like expanding means to the expanding member at the peripheral surface. The principle of construction of this expanding member is well known. The improvement, however, consists in providing this expanding member with reinforcing strut-like protruding tentacles 15 which, in the embodiment, have tongues of tapering shape coming to the point 16 and the sides of these struts 15 merge into and penetrate the peripheral portion of the smaller end of the expanding member 9. These strut-like projections are integral with the portion 9 and in the preferred form are made therewith out of one piece. It will be noted that these tentacle-like extensions protrude from and beyond the smaller end of said expanding member in a direction generally in line with the axis of the expanding member, and are shaped to have a progressively larger distance from said axis from its base at the smaller end of the expanding member to its free end. The expansible material may be molded or cast around these tentacle-like projections.

It will be noted from Fig. 4 that these reinforcing strut-like projections 15 extend outwardly and diverge from the axis of the member 9, and it will be noted from Fig. 6 that they are embedded in the soft expansible material 20 in the manner shown in Fig. 6. The expansible member shown in Fig. 5 is a cross section showing openings 22 into which the tongues 15 of the expanding member are embedded, thereby illustrating how the expanding strut reinforced member and the expansible member are held together.

In certain cases, the reinforcing struts at the place where the peripheral portion of the expanding member 9 would pass, save for the reinforcing tongues, are provided with a notch 25 whereby the struts 50 may readily break off in the event certain pressure should force the reinforcing struts 15 away from the conical body 10 to the extent of the breaking strain, and in which case the strut 15 would then float, so to say, in the soft material 20 acting as a skeleton therein to reinforce the soft material forming the expansible member.

It is, however, not essential to have the slot 25, since one of the important features of this invention is to provide the expansion device with means of reinforcement of the relatively soft but non-compressible expansible member, these means being embodied in the strut-like projection tentacles placed peripherally outside of the cone-shaped expanding member, they are intended to penetrate and reinforce the expansible member or members and act like so many struts, with abutments 33 (Fig. 7) around the peripheral surface of the hole, when same are permanently expanded within the expansion device holder. The expanding member acts as a pressure member upon the expansible member, and when pressure is applied it is transferred also to the reinforcing member embedded with the expansible member.

It will therefore be seen that the invention consists in providing an expanding or force exerting member, which enters into or contacts with the expansible member, and when pressure is applied to the expansible member, the temporary member is also subjected to such pressure. An added feature and advantage is that of holding the expanding member and expansible member in assembled relationship, or in the case where one or more expanding members are used, as is well known in the art, to have the two expanding members secured to the expansible member by these reinforcement means.

In Fig. 9, I have shown a different embodiment of the reinforcement means embedded into the expansible member 28, in the form of a punched metal sheet skeleton 27 having many tentacles 29 protruding outside of the small end of the expanding member 31. A circular groove 34 forms part of the punched skeleton and offers peripheral retaining means to prevent the relatively soft and plastic material constituting the expansible member from leaking or spreading beyond the base of the expanding member 31. The circular ring 34 is adapted to engage the small end of the expanding member and is split at 34, while the prongs or tentacles 29 are locked at 30 into a circular depression 30a provided at the small end of the expanding member.

In Figure 10 the reinforcing means are embodied into a pad or ring-shaped expansible member 32 made of plastic material. In this case the skeleton 33 constituting the reinforcement means, is completely buried within the plastic material, and having a damming action on same it prevents it from spreading or leaking outside of its holder when pressure is applied.

I have shown various embodiments of my invention, but it is clear that changes may be made therein without departing from the spirit of the invention as defined by the appended claims.

I claim:—

1. In an expansion bolt, having tapering expanding members in the general form of truncated cones with their smaller diametered ends arranged face to face, and an expansible member having a bore adapted to be engaged at each end by said smaller diametered ends of the tapering expanding members for acting upon the expansible member therebetween, the combination with projections extending beyond the smaller diametered ends of the expanding members away from the same, in the general direction of the axes of said expanding members the projections of one expanding member being arranged staggered in respect to the projections of the other expanding member, of recessed portions in the body of said expansible member adapted to be engaged by said projections for holding the expanding and expansible members in assembled relation ready for installation, said expansible member being molded or cast around said projections.

2. In an expansion bolt, having a tapering expanding member in the general form of a truncated cone having a recess near its smaller diametered end, and an expansible member having a bore adapted to be engaged by said end of the tapering expanding member for acting upon the expansible member, the combination of reinforcing tentacle-like projections having their body portions embedded within the mass of the expansible member and protruding outside of said expansible member and engaging the recess at said tapered end of the expanding member, for holding the expanding and expansible members in assembled relation ready for installation.

3. In an expansion bolt, having a tapering expanding member in the general form of a truncated cone having a peripheral recess near its smaller diametered end and an expansible member having a bore adapted to be engaged by said end of the tapering expanding member for acting upon the expansible member, the combination of reinforcing tentacle-like projections having their body portions embedded in and disposed peripherally within the mass of the expansible member but protruding outwardly and peripherally outside of said expansible member and engaging the peripheral recess at the small tapered end of the expanding member, for holding the expanding and expansible members in assembled relation ready for installation.

4. In an expansion bolt, having a tapering expanding member in the general form of a truncated cone having a recess at its outer side near its smaller diametered end, and a tapered expansible member having at its said tapered end a bore adapted to be engaged by said end of the tapering expanding member for acting upon the expansible member, the combination of a skeleton structure embedded within the mass of the expansible member, said skeleton structure having a split circular retaining groove and over the tapered end of the expansible member adjacent to the tentacle-like projections of the said skeleton structure, the said tentacle-like projections protruding outside of said expansible member and engaging the recess at the small tapered end of the expanding member, for holding the expanding and expansible members in assembled relation ready for installation.

5. In an expansion device composed of a hard material pressure member and a soft material expansible member adapted to be subjected to pressure by said pressure member, for deforming it, a reinforcing member embedded within the expansible member and forming an integral part of the expansible member, whereby the reinforcing member is inclosed within the expansible member, said expansible member being acted upon by the pressure applied to the expansible member when the pressure member exerts its pressure upon the expansible member, said expansible member surrounding said reinforcing member in an integral manner before and after said pressure is applied to the expansible member.

6. In an expansion device composed of a tapering expanding member in the general form of a truncated cone, and an expansible member having a bore adapted to be engaged by the smaller diametered end of the tapering expanding member for acting upon the expansible member, the combination with an extension on said expanding member protruding from and beyond said smaller end of said expanding member in a direction generally in line with the axis of the expanding member, of a portion of said expansible member surrounding said projection embedded therein, whereby upon the entrance of the expanding member into the bore of the expansible member, said portion with said projection is moved substantially radially outwards.

7. In an expansion bolt, having a tapering expanding member in the general form of a truncated cone and an expansible member having a bore adapted to be engaged by the smaller diametered end of the tapering expanding member for acting upon the expansible member, the combination with tentacle-like extensions protruding from and beyond said smaller end of said expanding member in a direction generally in line with the axis of the expanding member, of a recessed portion in said expansible member adapted to be engaged by said tentacle-like extensions for holding the expanding and expansible members in assembled relation ready for installation.

8. In an expansion bolt, having a tapering expanding member in the general form of a truncated cone and an expansible member having a bore adapted to be engaged by the smaller diametered end of the tapering expanding member for acting upon the expansible member, the combination with tentacle-like extensions protruding from and beyond said smaller end of said expanding member in a direction generally in line with the axis of the expanding member, of a recessed portion in said expansible member adapted to be engaged by said tentacle-like extensions for holding the expanding and expansible members in assembled relation ready for installation, said tentacle-like extensions being integral with said expanding member.

9. In an expansion bolt, having a tapering expanding member in the general form of a truncated cone and an expansible member having a bore adapted to be engaged by the smaller diametered end of the tapering expanding member for acting upon the expansible member, the combination with tentacle-like extensions protruding from and beyond said smaller end of said expanding member in a direction generally in line with the axis of the expanding member, of a recessed portion in said expansible member adapted to be engaged by said tentacle-like extensions for holding the expanding and expansible members in assembled relation ready for installation, said tentacle-like extensions being shaped to have a progressively larger distance from said axis from its base at the smaller end of the expanding member to its free end.

10. In an expansion bolt having a tapering expanding member in the general form of a truncated cone and an expansible member having a bore adapted to be engaged by the smaller diametered end of the tapering expanding member for acting upon the expansible member, the combination with tentacle-like extensions protruding from and beyond said smaller end of said expanding member in a direction generally in line with the axis of the expanding member, of a recessed portion in said expansible member adapted to be engaged by said tentacle-like extensions for holding the expanding and expansible members in assembled relation ready for installation, said extensions having weakened portions in proximity to the end of the expanding member, to enable them to be readily separated.

G. E. ROHMER SALEH.